United States Patent [19]
Sasaki

[11] Patent Number: 6,020,709
[45] Date of Patent: Feb. 1, 2000

[54] AUTOMATIC CONTROLLER

[75] Inventor: Tadashi Sasaki, Omiya, Japan

[73] Assignee: Fuji Photo Optical Co., Ltd., Saitama, Japan

[21] Appl. No.: 09/110,855

[22] Filed: Jul. 7, 1998

[30] Foreign Application Priority Data

Jul. 8, 1997 [JP] Japan ................................. 9-182669

[51] Int. Cl.$^7$ ................................................. G05B 11/36
[52] U.S. Cl. ........................... 318/609; 318/610; 318/66
[58] Field of Search ........................... 318/66, 609, 610; 355/25, 53

[56] References Cited

U.S. PATENT DOCUMENTS

| | | | |
|---|---|---|---|
| 4,408,148 | 10/1983 | Hezog | 318/610 |
| 4,415,966 | 11/1983 | Herzog | 364/162 |
| 5,107,193 | 4/1992 | Iwashita | 318/560 |
| 5,134,354 | 7/1992 | Yamamotor et al. | 318/609 |
| 5,231,442 | 7/1993 | Kitazawa et al. | 354/400 |
| 5,418,440 | 5/1995 | Sakaguchi et al. | 318/560 |

*Primary Examiner*—Karen Masih
*Assistant Examiner*—Rita Leykin

[57] ABSTRACT

To drive a lens part by a servo motor, an automatic controller turns on the first switch to input a desired value to an error amplifier from a final controlling element, and turns off the second switch to activate a feedback circuit which performs negative feedback. On the other hand, if the desired value is 0, or if the final controlling element does not work, the automatic controller turns off the first switch to shut out the desired value from the final controlling element, and turns on the second switch to activate the feedback circuit which performs positive feedback. This enables hand operation of the lens part with support of the positive feedback.

8 Claims, 5 Drawing Sheets

FIG. 4
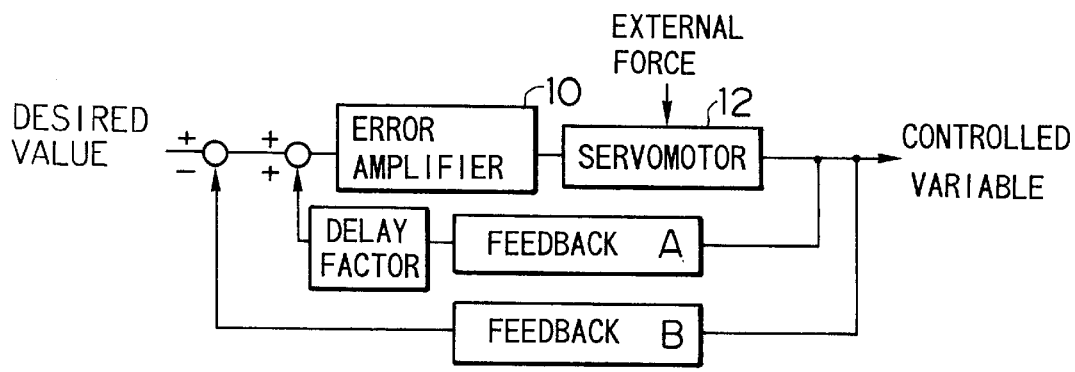
FIG. 5 (A) TORQUE (EXTERNAL FORCE)
FIG. 5 (B) ANGULAR VELOSITY
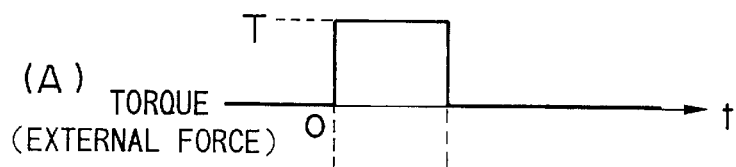
FIG. 6 (A) WHEN FEEDBACK A IS SMALL
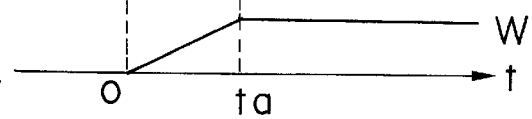
FIG. 6 (B) WHEN FEEDBACK B IS LARGE
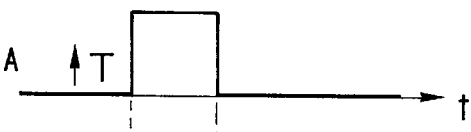

F I G. 7 (A)
WHEN THERE IS
A DELAY FACTOR
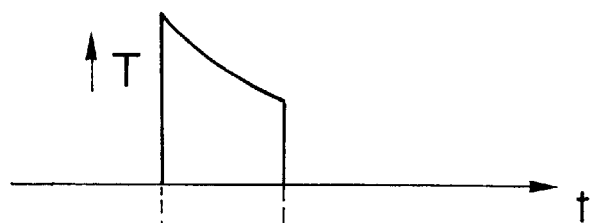
F I G. 7 (B)
WHEN THERE IS
NO DELAY FACTOR
F I G. 8 (A)
WHEN THE DELAY FACTOR
IS LARGE
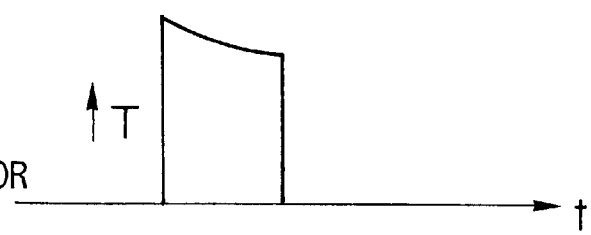
F I G. 8 (B)
WHEN THE DELAY FACTOR
IS SMALL
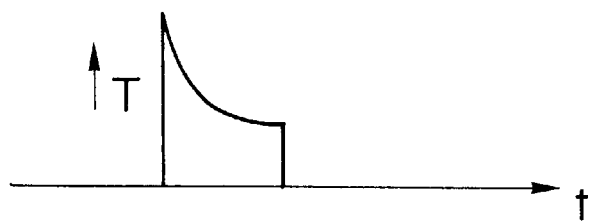

ial controller, and more particularly to an automatic controller which automatically controls the subject of control by a motor, and which enables control by external forces such as hand operation.

AUTOMATIC CONTROLLER

BACKGROUND OF THE INVENTION

1. Field of the Invention

The present invention relates generally to an automatic controller, and more particularly to an automatic controller which automatically controls the subject of control by a motor, and which enables control by external forces such as hand operation.

2. Description of Related Art

There is a conventional automatic controller which controls the subject of control so that the position and speed, etc. thereof can follow arbitrary changes in desired value. The automatic controller is applied to drive a zoom lens of a TV camera for example. To drive the zoom lens by a motor, the automatic controller makes the rotational speed of the motor follow changes in desired value which is input by a final controlling element, and it moves the zoom lens at desired speed.

If a disturbance (external force) effects the controlled variable such as the position and speed of the subject of control such as the zoom lens, the above-mentioned automatic controller detects the controlled variable and performs the negative feedback in order to reduce the effects of the disturbance. If the positive feedback were performed, the subject of control works, on detection of the disturbance, to increase an error even without the operation of the final controlling element. In this case, the subject of control is uncontrolled.

As stated above, the automatic controller is composed of the negative feedback to avoid the effects of the disturbance such as load changes on the controlled variable. Depending on the situation, however, some changes may be desired with respect to the controlled state. In this case, the operation using the external forces such as hand operation is sometimes more favorable than the operation of the desired value for control. For example, in the case of the automatic mode wherein the motor drives the zoom lens, it is more convenient if a user manually drives the zoom lens so that the zoom lens can be finely adjusted.

According to a conventional automatic controller, the hand operation is impossible unless the control of the automatic controller is cancelled. When an operator starts operating the subject of control manually in the automatic mode, the mode must be switched to the manual mode, and thus, the switching operation requires a lot of trouble.

SUMMARY OF THE INVENTION

The present invention has been developed under the above-described circumstances, and has as its object the provision of the automatic controller which controls the subject of control in such a way that the position, speed, etc. thereof can follow arbitrary changes in desired value, and which changes aims of control by switching automatic control modes not mechanically, thus enabling the control by external forces such as hand operation.

To achieve the above-mentioned object, the present invention is directed to the automatic controller which receives a desired value for controlling the subject of control, driven by a motor, to a desired controlled variable, and which performs a negative feedback of the detected controlled variable to the desired value at a preset gain to obtain a difference between the controlled variable and the desired value, the automatic controller running the motor such that the difference is 0, comprising: an external force mode for driving the subject of control by external forces; and negative feedback gain switching means which reduces a gain of the negative feedback compared to the case when the motor drives the subject of control when switching to the external force mode.

The present invention reduces the gain of the negative feedback when the motor drives the subject of control, thereby reducing the damping force of the motor, which is generated by the negative feedback. It is therefore possible to drive the subject of control by the external forces (e.g. hand operation). This makes possible immediate changeover of driving for the subject of control from the motor driving to the hand operation.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 4 is a view showing the case where a delay factor is added to the positive feedback in FIG. 1;

FIG. 5(A) is a view showing the torque (external force), and FIG. 5(B) is a view showing the angular velocity;

FIG. 6(A) is a view showing the torque in the case when the positive feedback is small, and FIG. 6(B) is a view showing the torque in the case when the positive feedback is large;

FIG. 7(A) is a view showing the torque in the case when there is a delay factor, and FIG. 7(B) is a view showing the torque in the case when there is no delay factor;

FIG. 8(A) is a view showing the torque in the case when the delay factor is large, and FIG. 8(B) is a view showing the torque in the case when the delay factor is small;

DETAILED DESCRIPTION OF THE PREFERRED EMBODIMENT

This invention will be described in further detail by way of example with reference to the accompanying drawings.

Figure 1:
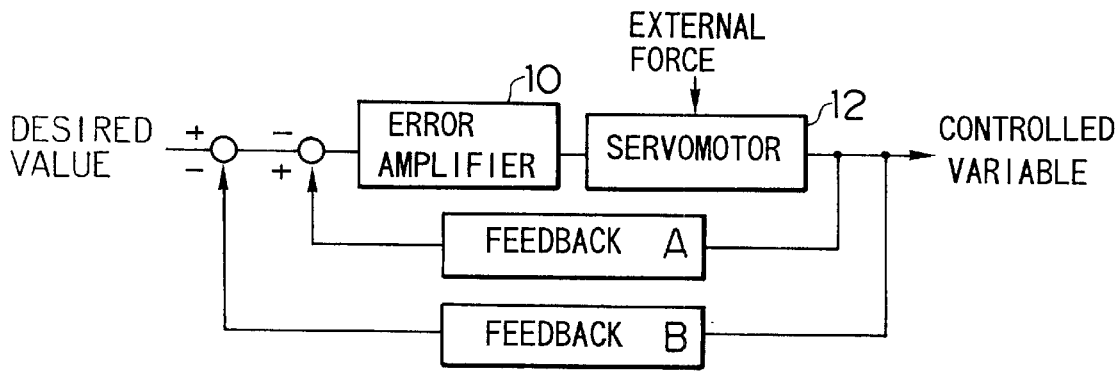
FIG. 1 is a view showing components of the automatic controller according to the present invention.

FIG. 1 shows components of the automatic controller according to the present invention, which automatically controls a rotational angle, rotational speed, etc. of a servo motor 12. The automatic controller is comprised mainly of an error amplifier 10, a feedback A, and a feedback B. The servo motor 12 connects to an output side of the error amplifier 10, and an output of the error amplifier 10 runs the servo motor 12. The feedback A and the feedback B feed back the controlled variable of the servo motor 12 (e.g. the rotational angle and the rotational speed) to an input side of the error amplifier 10.

When the automatic controller receives a desired value for the controlled variable of the servo motor 12, the feedback A and the feedback B feed back the controlled variable of the servo motor to the desired value. The fed-back desired value is input to the error amplifier 10.

The feedback A is positive, and it adds, to the desired value, a value which is obtained by multiplying the controlled variable of the servo motor 12 by a preset gain. On the other hand, the feedback B is negative, and it subtracts, from the desired value, a value which is obtained by multiplying the controlled variable of the servo motor 12 by a preset gain.

According to the automatic controller which is constructed in the above-mentioned manner, the negative feedback B reduces the effects of the disturbance (external force) on the controlled variable of the servo motor 12, and operates to make the servo motor 12 follow the desired value. On the other hand, the positive feedback A receives the external forces (such as hand operation) and operates so that the servo motor 12 can rotate in accordance with the external force. Accordingly, it is possible to adjust the working sensitivity of the servo motor with respect to the external forces by executing the positive and negative feedback in a proper ratio.

For instance, by making the gain of the positive feedback relatively smaller than that of the negative feedback, or by stopping the positive feedback, the servo motor 12 is controlled by the desired value without the effects of the external forces. To the contrary, by making the gain of the positive feedback relatively larger than that of the negative feedback, the servo motor 12 becomes more sensitive to the external force.

Figure 2:
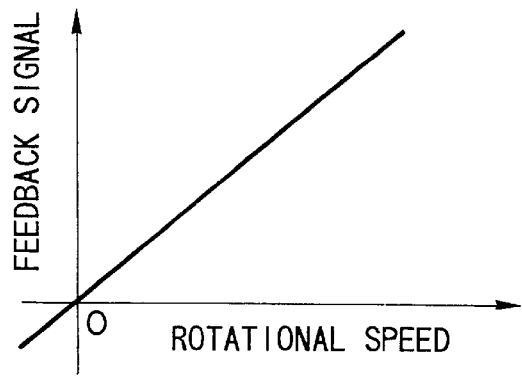
FIG. 2 is a view showing a relationship between the rotational speed and the feedback signal.
Figure 3:
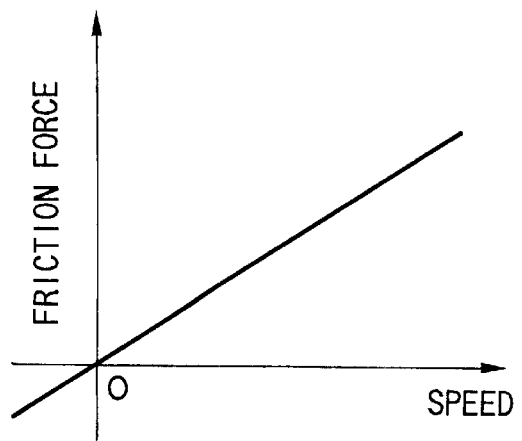
FIG. 3 is a view showing a relationship between the speed and the friction force, the relationship developed by the viscous resistance.

A rotational speed sensor (a tachometer) detects the rotational speed of the servo motor 12. If the rotational speed is the controlled variable of the servo motor 12, the feedback is proportional to the rotational speed as shown in FIG. 2. The higher the rotational speed is, the more the negative feedback B becomes resistant against the external force. Since the resistance is distributed in the same manner as viscous resistance shown in FIG. 3, the negative feedback is able to operate spuriously as viscous load against the external force.

Furthermore, it is also possible to provide an inertia load spuriously by adding a delay factor 14 to the feedback as shown in FIG. 4. In FIG. 4, components similar to those described with reference to FIG. 1 are denoted by the same reference numerals. In the operation of the delay factor 14, a torque T is applied in accordance with the following equation:

$$T = J\omega' \quad (1)$$

where the angular velocity is $\omega$, the angular acceleration $\omega'$, and the inertial moment is J. As shown in FIG. 5(B), the angular velocity $\omega$ increases linearly at the angular acceleration of $\omega' = (\omega - 0)/t_a$.

According to the above equation (1), the inertia moment J is represented by the following equation:

$$J = T/\omega' \quad (2)$$

The torque T is proportional to the inertial moment J if the angular acceleration $\omega'$ is constant.

The smaller the gain of the positive feedback A is, the larger is the torque T required for rotating the servo motor at preset angular velocity $\omega$ as shown in FIG. 6. Since the delay factor 14 is added to the positive feedback as shown in FIG. 4, the large torque must be applied by the external force at the early stages because the positive feedback is small. As time passes, the positive feedback becomes larger, and the torque T is reduced. FIG. 7(B) shows the torque in the case wherein no delay factor is provided. The delay factor 14 applies the inertial load spuriously to provide the great operating sensation when the servo motor 12 is run by the external force.

It is also possible to change and adjust an operating sensation by changing the delay of the delay factor 14 as shown in FIGS. 8(A) and 8(B).

Figure 9:
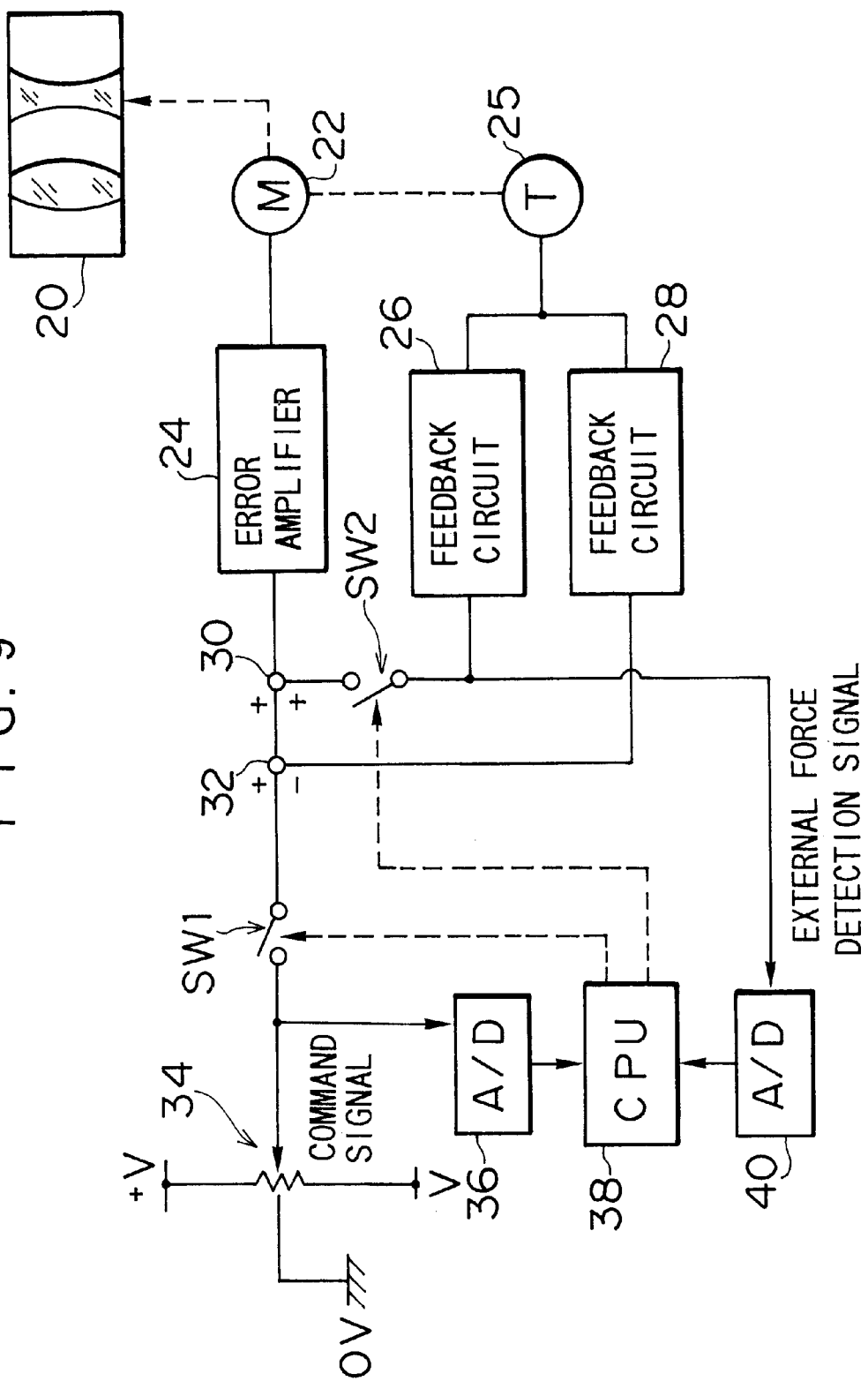
FIG. 9 is a view illustrating the automatic controller of the present invention which is applied to drive a lens of a camera.

FIG. 9 shows an example wherein the automatic controller is applied to a zoom control or focus control for a lens part of a TV camera. The lens part 20 is driven by the servo motor 22 or by hand operation. The servo motor 22 connects to the output side of the error amplifier 24 as is the case with the automatic controller in FIG. 1, and the servo motor is run by a drive voltage which is output from the error amplifier 24. A tachometer 25 is mounted in the servo motor 22, and the tachometer 25 detects the rotational speed of the servo motor 22 as the controlled variable. The tachometer outputs a detection signal, and it is fed back to the input side of the error amplifier 24 under a preset gain through a feedback circuit 26 and a feedback circuit 28.

The feedback circuit 26 and the feedback circuit 28 operate in the same manner as the feedback A and the feedback B shown in FIG. 1. The feedback circuit 26 adds a feedback signal to a desired value signal, which is input to the input side of the error amplifier 24 (positive feedback), by means of an adder 30. The feedback circuit 28 subtracts a feedback signal from the desired value signal by means of a subtractor 32 (negative feedback).

A switch SW2 is arranged between the feedback circuit 26 and the adder 30, and it is turned on and off based on the control of a CPU 38. The feedback circuit 26 outputs a feedback signal (an external force detection signal), which is input to the CPU 38 through an A/D converter 40.

The desired value signal, which is input to the input side of the error amplifier 24, is output from a final controlling element 34. In accordance with the manipulated amount, the final controlling element 34 outputs a desired value signal representing a desired value for the rotational speed of the servo motor 22. The desired value signal is input to the error amplifier 24 through a switch SW1 which is turned on and off by the control of the CPU 38. At the same time, the desired value signal, which is output from the final controlling element 34, is input to the CPU 38 through an A/D converter 38.

The CPU 38 controls the on-off operation of the switches SW1 and SW2 in accordance with the desired value signal and the external force detection signal, and it switches an automatic mode and a manual mode as described below.

Figure 10:
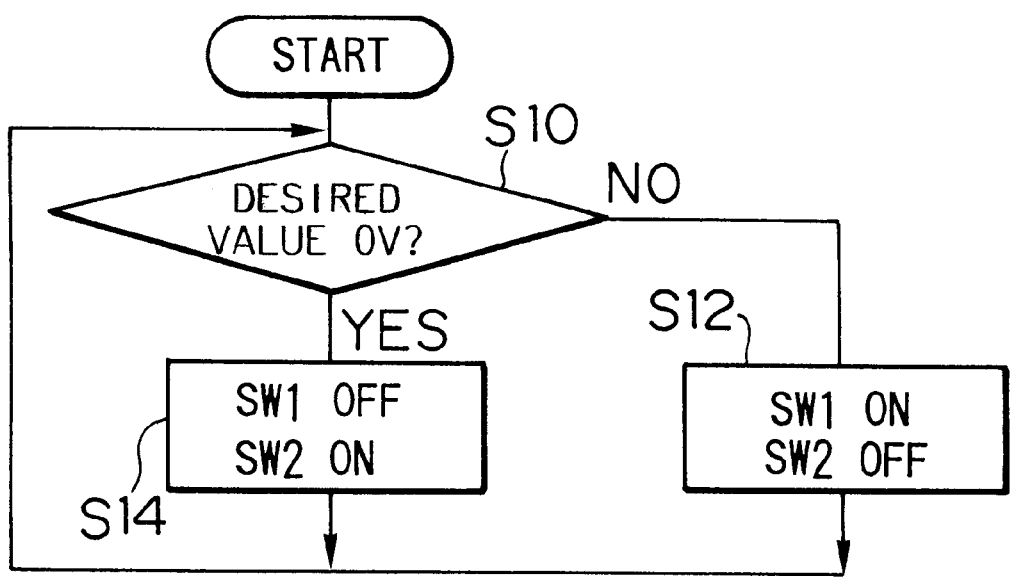
FIG. 10 is a flow chart showing the processing of a CPU in FIG. 9.

FIG. 10 is a flow chart showing an example of the processing of the CPU 38. At the start of operation, the CPU 38 detects a desired value for the control dependently on the control signal, and determines whether the desired value is 0V or not (step S10). If NO, or if the final controlling element is operated, the CPU 38 turns on the switch SW1 and turns off the switch SW2 (step S12). Consequently, the feedback circuit 28 performs the negative feedback, whereas the feedback circuit 26 does not perform the positive feedback. The servo motor 22 controls the lens part 20 in accordance with the operation of the final controlling element 34 (the automatic mode).

If YES, or if the final controlling element is not operated, the CPU 38 turns off the switch SW1 and turns on the switch SW2 (step S14). This shuts out the desired value signal, and causes the feedback circuit 26 to perform the positive feedback, thus enabling the hand operation of the lens part 20 (the manual mode).

In short, if the final controlling element 34 is operated, the CPU 38 drives the lens part 20 by the servo motor 22 in the automatic mode, and if the final controlling element 34 is not operated, the CPU 38 switches to the manual mode to enable the manual operation of the lens part 20.

In the above explanation, the automatic mode is switched to the manual mode according to whether the desired value is 0V or not. The control mode may also be switched from the automatic mode to the manual mode according to whether the lens part 20 is stationary or not. If the lens part 20 stops, the control mode is switched from the automatic mode to the manual mode.

The CPU 38 may also switch the control mode from the automatic mode to the manual mode when it detects the application of the external forces dependently on the external force detection signal. To detect the application of the external forces, the CPU 38 compares the external force detection signal with the desired value signal, and decides that the external forces have been applied when a difference between those two signals is larger than a predetermined value.

Moreover, a pushbutton switch, which is easy to operate, may be provided in the camera. In this case, the CPU 38 detects the on-off operation of the pushbutton switch to switch the control mode from the automatic mode to the manual mode.

As stated above, it is possible to switch the lens operation between the motor-driven operation and the hand operation without a mechanical clutch mechanism, and therefore, the automatic controller is cost effective and easy to operate.

When the automatic controller in FIG. 9 is applied to drive the lens of the TV camera, the delay factor or a lead factor may be provided at the back of the feedback circuit 26 as shown in FIG. 4. The delay factor or the lead factor may also be provided at the back of the feedback circuit 28.

As stated above, only the negative feedback is performed to control the subject of control (the lens part 20) by the motor, and the positive feedback is added to the negative feedback to manually control the subject of control. The present invention, however, should not be restricted to this. If the above-mentioned negative feedback is switched to a feedback which is smaller in gain to enable the subject of control to be manually operated, the same effects can be achieved as in the case wherein the positive feedback is performed.

Moreover, such an application is conceivable that the gain of the positive feedback is larger than that of the negative feedback. In this case, moving the subject of control slightly by hand operation makes it possible for the subject to keep moving until it is stopped forcibly.

As set forth hereinabove, according to the present invention, the negative feedback is smaller in gain compared with the case when the motor drives the subject of control. Thus, a damping force of the motor, which is generated by the negative feedback, is reduced, and therefore, the external force such as the hand operation can drive the subject of control. Consequently, even if the subject of control is automatically controlled by the motor, it is possible to switch the driving for the subject of control the motor driving to the hand operation without mechanically switching the control modes with use of the clutch, etc.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. An automatic controller which receives a desired value for controlling a subject of control, driven by a motor, to a desired controlled variable, detects a controlled variable of said subject of control, and performs negative feedback of the detected controlled variable to said desired value at a preset gain to obtain a difference between the controlled variable and said desired value, said automatic controller running said motor such that said difference is 0, comprising:

said auto controller being operable in an external force mode for driving said subject of control by external forces; and a negative feedback gain switching circuit which reduces a gain of said negative feedback compared to the case when said motor drives said subject of control when switching to said external force mode.

2. The automatic controller as defined in claim 1, wherein said negative feedback gain switching circuit switches to said external force mode when said subject of control is stationary.

3. The automatic controller as defined in claim 1, wherein said negative feedback gain switching circuit switches to said external force mode when a difference between the desired value and the controlled variable of said control of subject is more than a predetermined value.

4. The automatic controller as defined in claim 1, wherein said negative feedback gain switching circuit performs positive feedback of the controlled variable of said subject of control to said desired value at a preset gain to thereby reduce the gain of said negative feedback.

5. The automatic controller as defined in claim 4, wherein a delay factor is added to said positive feedback.

6. The automatic controller as defined in claim 1, wherein the controlled variable of said subject of control is a rotational speed of the motor.

7. The automatic controller as defined in claim 1, wherein said automatic controller is applied to a camera, and said subject of control is a focus lens or zoom lens which is driven by a motor and hand operation which are switched to each other.

8. The automatic controller as defined in claim 7, wherein when an external force is applied to said focus lens or zoom lens of said camera, a gain of said negative feedback is reduced to enable said focus lens or zoom lens to be driven by the external force.

* * * * *